United States Patent [19]

Matsuda et al.

[11] Patent Number: 5,093,880
[45] Date of Patent: Mar. 3, 1992

[54] OPTICAL FIBER CABLE COATED WITH CONDUCTIVE METAL COATING AND PROCESS THEREFOR

[75] Inventors: Akira Matsuda, Nikko; Akira Iino, Ichihara; Ryotomo Sirakawa, Imaichi, all of Japan

[73] Assignee: Furukawa Electric Co., Ltd., Tokyo, Japan

[21] Appl. No.: 572,563

[22] Filed: Aug. 27, 1990

[30] Foreign Application Priority Data

Aug. 30, 1989 [JP] Japan .................. 1-221832

[51] Int. Cl.$^5$ ............................ G02B 5/14; G02B 1/10
[52] U.S. Cl. .................................... 385/100; 385/128; 385/141; 65/DIG. 16
[58] Field of Search ............... 350/96.23, 96.30–96.34; 65/3.12, DIG. 16; 427/163; 428/368, 389

[56] References Cited

U.S. PATENT DOCUMENTS

| | | | |
|---|---|---|---|
| 4,183,621 | 1/1980 | Kao et al. | 350/96.30 |
| 4,402,993 | 9/1983 | Aisenberg et al. | 427/38 |
| 4,468,294 | 8/1984 | Hocker et al. | 204/27 |
| 4,512,629 | 4/1985 | Hanson et al. | 350/96.30 |
| 4,530,750 | 7/1985 | Aisenberg et al. | 65/3.12 X |
| 4,735,856 | 4/1988 | Schultz et al. | 350/96.30 X |

FOREIGN PATENT DOCUMENTS

| | | |
|---|---|---|
| 0065618 | 12/1982 | European Pat. Off. . |
| 0308143 | 9/1988 | European Pat. Off. . |
| 51-54445 | 5/1976 | Japan . |
| 2-166410 | 7/1990 | Japan . |

OTHER PUBLICATIONS

"Reducing Loss of Metal Coated Fiber", Tanaka et al., National Convention Record, The Institute of Electronics, Information and Communication Engineers, 1985, pp. 4–207.

Database Wpil No. 90-104388, Derwent Publications Ltd., London, GB; & JP - A 880320451, Jun. 27, 1990.

Patent Abstracts of Japan, vol. 11, No. 371 (C-462)(2818), 3 Dec. 1987; & JP - A - 62143848, Jun. 27, 1987.

*Primary Examiner*—Akm Ullah
*Attorney, Agent, or Firm*—Staas & Halsey

[57] ABSTRACT

An optical fiber cable free from a generation of a microbent during manufacturing, and in which an impregnation of hydrogen and/or water to a cladding is prevented, and having high electrical conduction, tolerance to heat and mechanical strength, and a process for making same. The optical fiber cable includes a silica based glass optical fiber including a core and a cladding, a thin carbon coating formed on an outer surface of the optical fiber, and an electrically conductive coating formed on an outer surface of the carbon coating. The carbon coating functions as a layer for preventing the impregnation of hydrogen and/or water to the optical fiber, and the conductive coating functions as a heat tolerance member, a conductive member, and a mechanical support member. The carbon coating is preferably formed as an amorphous carbon layer. Preferably, the conductive coating can be made of materials having a good contact with the carbon coating, a high conductivity, a high heat tolerance, and a high strength, and can be formed as thin as possible. The conductive coating can be formed by a plurality of different metal layers having different thickness.

17 Claims, 3 Drawing Sheets

OPTICAL FIBER CABLE COATED WITH CONDUCTIVE METAL COATING AND PROCESS THEREFOR

BACKGROUND OF THE INVENTION

1. Field of the Invention

The present invention relates to an optical fiber cable, more particularly, an optical fiber cable coated with a conductive metal coating, and a process for making same.

2. Description of the Related Art

Optical fiber cables have been extensively employed in a variety of fields, and when such optical fiber cables are employed in nuclear power plants or chemical plants in particular, a tolerance to heat is required, and thus optical fiber cables coated with layers of metal are used.

As one prior art process for making a metal coating for the optical fiber, a dipping method is known in which a threaded optical fiber made of silica based glass is dipped in a bath containing an aluminium, to thereby form an aluminium coating on the optical fiber. This dipping method, however, suffers from a disadvantage of a generation of a microbent, which causes an increase of a transmission loss in the optical fiber cable. More specifically, a coefficient of linear expansion of the silica based glass is approximately $0.4 \times 10^{-6}/°C$., but a coefficient of linear expansion of aluminium is approximately $29 \times 10^{-6}/°C$., i.e., approximately 70 times that of the silica based glass optical fiber. Further, the melting point temperature of the aluminium is high, and accordingly, when aluminium is cooled to become a solid and the aluminium coating is to be shrunk, a stress due to the aluminium coating causes a shrinkage of the optical fiber, to thereby cause the microbent. This microbent causes a transmission loss in the optical fiber. This problem of the dipping method also arises with metals other than aluminium.

Tanaka, et. al., in a paper, "Reducing Loss of Metal Coated Fiber", National Convention Record, The Institute of Electronics, Information and Communication Engineers, 1985, page 4–207, disclose a technology whereby an additional stress corresponding to a stress causing the microbent during the cooling of the dip material, such as aluminium, is applied to an optical fiber to compensate the microbent. It is known through experiments that, when the optical fiber coated with aluminium is expanded by the stress, e.g., by approximately 0.15%, the transmission loss is at a minimum.

Nevertheless, the compensation method disclosed in the above suffers from a disadvantage in that adding the additional stress increases the processes, and although the transmission loss can be compensated by applying the additional stress, the transmission loss can not be restored to an initial value. Further, the application of the additional stress must be held within a suitable range, because if an extra additional stress is applied thereto, the transmission loss is increased, and accordingly, the control of the application of this additional stress is difficult.

Further, when a metal coating is directly formed on a silica based glass optical fiber by the dipping method, the contact between the silica based glass optical fiber and the metal is weak, and therefore, when the optical fiber coated with the metal coating is bent, the metal coating is easily peeled from the optical fiber.

As an alternative to the above mentioned dipping method, Japanese Unexamined (Kokai) Patent Publication No. 51(1976)-54445 discloses a method of forming a metal coating by applying an electroless (chemical) plating process on an optical fiber. The electroless plating is carried out at a relatively low temperature, and thus a microbent will not be caused. The forming of the metal coating by the electroless plating process, however, suffers from a disadvantage of a low metal formation speed when forming the metal coating to a predetermined thickness required as a coating, and thus the optical fiber must be dipped into an electroless plating bath for a long time. The latter causes an incursion of hydrogen and/or water to the optical fiber, which causes a transmission loss of the optical fiber and/or reduces the mechanical strength of the optical fiber.

Further, U.S. Pat. No. 4,183,621 and EPC Publication No. 0308143 disclose methods wherein a carbon is coated on an optical fiber to increase a sealing thereof against an impregnation of hydrogen and/or water, to thereby prevent an incursion of hydrogen and/or water, whereby an increase of the transmission loss of the optical fiber is prevented. Also, a coefficient of linear expansion of carbon is close to that of the silica based glass optical fiber, and thus the microbent is not caused. The methods disclosed in the publications, however, are intended only to prevent the incursion of hydrogen and/or water, and are not intended to increase a tolerance to heat, a mechanical strength, and to have an electrical conduction function. As a result, optical fibers according to the methods disclosed in the publications can not be employed in high temperature conditions, or under conditions which requires a mechanical strength and an electrical conduction.

SUMMARY OF THE INVENTION

An object of the present invention is to provide an improve optical fiber cable in which a sealing, a mechanical strength and a heat tolerance are increased, and which has an electrically conductive layer, and a process for making same.

Another object of the present invention is to provide a process for making the optical fiber cable, by which a productability thereof is improved.

To achieve the objects set forth above, according to the present invention, (a) a base coating, such as a carbon coating which has a coefficient of linear expansion close to that of a silica based glass optical fiber, to thereby prevent a generation of a microbent, has a good contact with the optical fiber, to thereby prevent an incursion of hydrogen and/or water to the optical fiber, and thus preferably a carbon coating as the base coating is formed on the optical fiber, and (b) an electrically conductive metal coating is formed on the base coating.

Therefore, according to the present invention, there is provided an optical fiber cable including, an optical fiber made of silica based glass and containing a core and a cladding, preferably, further containing a silica based glass jacket formed on the cladding, a carbon coating formed, as the base coating, on an outer surface of the cladding, and an electrically conductive metal coating formed on an outer surface of the carbon coating.

In the context of this specification, an optical fiber means a cable comprised of a core and a cladding, and preferably, further comprised of a jacket formed on the cladding and made of silica based glass, and an optical fiber cable means a cable comprised of the carbon coating and the electrically conductive coating, in addition to the optical fiber.

Also, according to the present invention, there is also provide a process for making the optical fiber cable, including the step of forming the carbon coating and the step of forming the electrically conductive metal coating.

The electrically conductive coating can be formed by an electroless plating process, a sputtering or a metal evaporation process, or a combination of an electroless plating and an electroplating process, two electroless plating processes and one electroplating process, an electroless plating and a sputtering process, or an electroless plating and a metal evaporation process.

BRIEF DESCRIPTION OF THE DRAWINGS

These and other objects and features of the present invention will be described in more detail with reference to the accompanying drawings, in which.

DESCRIPTION OF THE PREFERRED EMBODIMENTS

The processes for making an optical fiber cable according to the present invention can be applied to a variety of optical fibers, such as a single-mode optical fiber or a multi-mode optical fiber, but in the following description, a single-mode optical fiber made of silica based glass will be described as an example.

Figure 1:
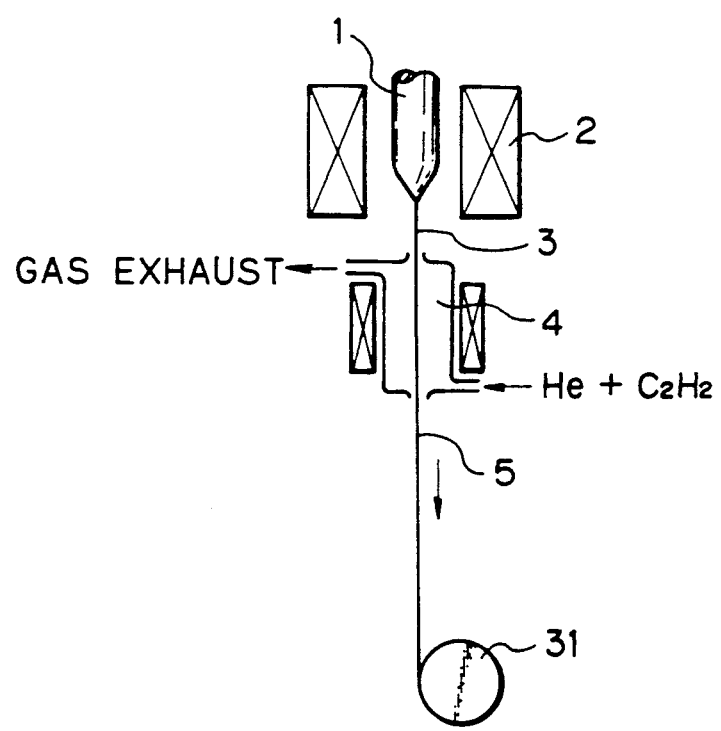
FIG. 1 is a schematic view of an apparatus for forming a cable coating on an optical fiber, as a first embodiment of an optical fiber cable making process according to the present invention.

FIG. 1 is a schematic view of an apparatus for forming a cable coating on an optical fiber, as a first embodiment of an optical fiber cable making process according to the present invention.

In FIG. 1, a silica based glass preform 1 formed by a known method is introduced into a threading furnace 2 to be threaded at a line tension force of 20 g and a line speed of 300 m/min, to thereby produce an optical fiber 3 including a core and a cladding surrounding the core. Preferably, a jacket of a silica based glass can be formed on an outer surface of the cladding, but in the specification the description thereof is omitted. A diameter of the core is, for example, 10 μm, and an outer diameter of the cladding is, for example, 125 μm. After the threading process, the threaded optical fiber 3 having a diameter of 125 μm is introduced into a reaction furnace 4, and a carbon coating is then formed on an outer surface of the cladding.

This carbon coating formation will be described in more detail. Inert gases, such as helium ($H_e$) and hydrocarbon gas, for example, $C_2H_2$, flow through the reaction furnace 4, and the reaction furnace 4 is heated to several hundreds degree centigrade (°C.), if required. Under these conditions, an amorphous carbon coating having a thickness of approximately 500 Å (Ångström) is formed on an outer surface of the cladding of the optical fiber. The amorphous carbon has a compact structure, and thus prevents an incursion of hydrogen and/or water to the optical fiber during later described processes.

A coefficient of linear expansion of the carbon is $5 \times 10^{-6}$/°C., and is close to that of the silica based glass optical fiber, i.e., $0.4 \times 10^{-6}$/°C., and therefore, a microbent due to the difference therebetween during a cooling thereof is not caused. The amorphous carbon has a good contact with the silica based glass cladding, and accordingly, the amorphous carbon coating is free from defects caused by rubbing or bending, i.e., the amorphous carbon coating is not peeled from the cladding even if the optical fiber is rubbed and/or bent. Furthermore, the amorphous carbon coating functions to protect the cladding from damage during the subsequent processes. Therefore, the optical fiber 5 coated with the amorphous carbon coating can be easily handled, e.g., can be wound up on a bobbin 31.

A metal coating is formed on the optical fiber coated with the amorphous carbon coating, by an electroless plating process. Metals able to be easily electrolessly plated, having a good contact with the carbon coating, and further, having a large electric conductivity, i.e., a small electric resistance, are most preferably used as the coating material.

A metal coating formation of a first embodiment according to the present invention will be described with reference to the following Examples 1 to 5.

EXAMPLE 1

This example shows that a nickel (Ni) coating is formed on the carbon coating by the electroless plating process. The manufacturing steps are now described.

Step 1: Cleaning

The optical fiber coated with the carbon coating, specifically the amorphous carbon coating, is dipped into a container filled with an aqueous solution containing 200 ml/l of a cleaning solution (Z-200 made by World Metal Corporation) for two minutes at approximately 50° C., to eliminate impurities or contamination deposited on the carbon coating. This dipping is carried out by rewinding the optical fiber from a supply reel (not shown), dipping the optical fiber into a container (not shown) filled with the aqueous solution, and winding the optical fiber onto a take-up reel (not shown).

Step 2: Washing away the cleaning solution Z-200 deposited on the optical fiber with water Step 3: Etching The optical fiber coated with the carbon coating is dipped into a container filled with 200 ml/l of an aqueous etching solution to which is added an agent (MC-E made by World Metal Corporation) to 200 ml/l of a 36% HCL solution for 30 seconds at a room temperature.

Step 4: Washing away the etching solution with water

Step 5: Activation (Phase 1)

The optical fiber coated with the carbon coating is dipped into a container filled with an aqueous solution containing 200 ml/l of an activating reagent (MC-C made by World Metal Corporation) for two minutes at approximately 50° C.

Step 6: Washing away the activating reagent with water

Step 7: Activation (Phase 2)

The optical fiber coated with the carbon coating is dipped into a container filled with 200 ml/l of an aqueous solution containing an activating reagent (MC-A made by World Metal Corporation) for two minutes at approximately 50° C.

Step 8: Washing away the activating reagent used in step 7, with water

Step 9: Ni coating formation (electroless plating process)

The optical fiber coated with the carbon coating is dipped into a container filled with 200 ml/l of an electroless plating solution of nickel and phosphorus (Ni-P), diluted from a thick Ni-P plating solution (MN-B made by World Metal Corporation) for five hours at approximately 90° C. As a result, a Ni coating having a thickness of approximately 100 μm is formed on the carbon coating.

Figure 2:
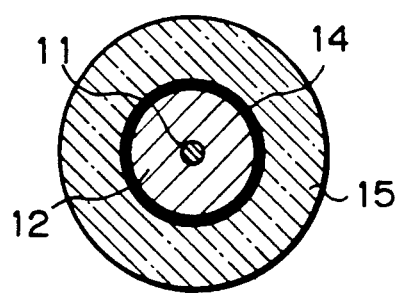
FIGS. 2 to 6 are sectional views of optical fiber cables formed by the first embodiment of the present invention.

Step 10: Washing away the electroless plating solution deposited on the Ni coating, with water Step 11: Washing the optical fiber cable having the Ni coating, with hot water Step 12: Drying the optical fiber cable As a result, as shown in FIG. 2, the optical fiber cable is composed of the silica based glass optical fiber comprised of the core 11 having a diameter of 10 μm and the cladding 12 having an outer diameter of 125 μm, the amorphous carbon coating 14 coated on the cladding to a thickness of 500 Å, and the Ni coating 15 having a thickness of 100 μm. Namely, an optical fiber cable coated by the electrically conductive metal, i.e., the Ni layer 15 having a diameter of approximately 325 μm, is formed. The carbon coating 14 and the Ni coating 15 are in good contact with each other, and thus the Ni coating 15 is not peeled from the carbon coating 14 when the optical fiber cable is bent. As described above, the Ni coating 15 functions as an electrical conduction member, and thus the Ni coating 15 can be used for an electrical connection to optical parts requiring a supply of power, as an electrically conductive member. Also, the optical fiber cable can be soldered to the optical parts. Further, the optical fiber cable is coated with the Ni coating 15 to a sufficient thickness, and accordingly, the optical fiber cable has a sufficient tolerance to heat and a sufficient mechanical strength. Note that the optical fiber is covered by the carbon coating, and thus hydrogen and/or water can not impregnate the optical fiber, i.e., the cladding and the core during the above mentioned steps for forming the Ni coating, to thereby prevent an increase of the transmission loss.

EXAMPLE 2

This example shows that a Ni coating is formed on the carbon coating by the electroless plating process, and a copper (Cu) coating is formed on the Ni coating also by the electroless plating process.

Accordingly, the following steps are carried out after steps 1 through 8 of Example 1.

Step 9a: Ni coating formation (electroless plating process)

The optical fiber coated with the carbon coating is dipped into a container filled with 200 ml/l of a Ni-P electroless plating solution, diluted from a high density Ni-P plating solution (MN-B made by World Metal Corporation) for 30 minutes at approximately 90° C., and as a result, a Ni coating having a thickness of 10 μm is formed on the carbon coating.

Step 10a: The optical fiber is washed with water

Step 11a: Cu coating formation (electroless plating process)

The optical fiber coated with the Ni coating is dipped into a container filled with a copper electroless plating solution (MCU-H made by World Metal Corporation) containing 125 ml/l of a copper ion supply solution (MCU-AH made by World Metal Corporation) and 125 ml/l of a redundant and complexing agent (MCU-BH made by World Metal Corporation) for two hours at approximately 70° C., whereby a Cu coating having a thickness of 10 μm is formed on the Ni coating.

Step 12a: The optical fiber is washed with water

Step 13a: The optical fiber is washed with hot water

Step 14a: The optical fiber is dried

Figure 3:
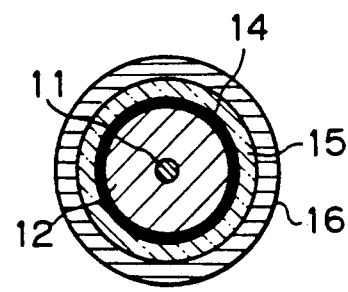

FIG. 3 shows the optical fiber cable according to the above processes. The optical fiber cable comprises the Ni coating 15 having a thickness of 10 μm, and the Cu coating 16 having a thickness of 10 μm. The core 11, the cladding 12 and the carbon coating 14 are identical to those in FIG. 2. Namely, an optical fiber cable coated by the electrically conductive metal of Cu and having a diameter of approximately 165 μm, is formed.

Compared with Example 1, the process time in steps 9a and 11a is shorter than the process time in step 9 of Example 1, and accordingly the total process time is shortened. Also, the Cu coating 16 has a larger electrical conductivity than that of the Ni coating 15 in FIG. 2, and thus this Cu coating 16 is preferable as a metal conductive member such as a electric feeding layer or a connecting member for optical devices. Furthermore, the diameter of this optical fiber cable is small, and thus many such optical fiber cables can be accommodated in a limited cable sheath, and further this optical fiber cable has a good flexibility and can be easily bent without a peeling of the coating.

EXAMPLE 3

This example shows that a Cu coating is formed on the carbon coating by the electroless plating process, and another Cu coating is formed on the first Cu coating also by the electroplating process.

Accordingly, the following steps are carried out, after steps 1 through 8 of Example 1.

Step 9b: Cu coating formation (same as in step 11a of Example 2)

A Cu coating having a thickness of 10 μm is formed on the carbon coating.

Step 10b: The optical fiber is washed with water

Step 11b: Cu coating formation (electroplating process)

A Cu coating having a thickness of 100 μm is formed by a bright copper sulfate electroplating process.

Step 12b: The optical fiber is washed with water

Step 13b: The optical fiber is washed with hot water

Step 14b: The optical fiber is dried

Figure 4:
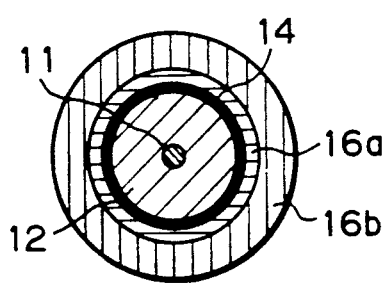

FIG. 4 shows the optical fiber cable according to the above processes. The optical fiber cable comprises the Cu coating 16a having a thickness of 10 μm, and the Cu coating 16b having a thickness of 100 μm. The core 11, the cladding 12, and the carbon coating 14 are identical to those in FIG. 2. Namely, an optical fiber cable coated by the electrically conductive metal of Cu and having a diameter of approximately 345 μm, is formed. The Cu electroless plating process at step 9b enables the Cu electroplating process at step 11b.

EXAMPLE 4

This example shows that a Ni coating is formed on the carbon coating by the electroless plating process, a Cu coating is formed by the electroless plating process, and a silver (Ag) coating is formed on the Cu coating also by the electroplating process.

Accordingly, the following steps are carried out, after step 12a of Example 2.

Step 13c: Ag coating formation (electroplating process)

An Ag coating having a thickness of 50 μm is formed on the Cu coating by a cyanide solution electroplating process.

Figure 5:
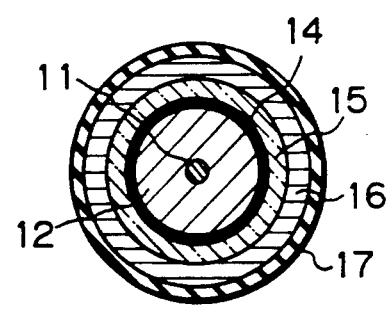

Step 14c: The optical fiber is washed with water
Step 15c: The optical fiber is washed with hot water
Step 16c: The optical fiber is dried FIG. 5 shows the optical fiber cable according to the above processes. The optical fiber cable comprises the Ni coating 15 having a thickness of 10 μm and coated on the carbon coating 14, the Cu coating 16 having a thickness of 10 μm, and the Ag coating 17 having a thickness of 50 μm. The core 11, the cladding 12, and the carbon coating 14 are identical to those in FIG. 2. Namely, an optical fiber cable coated by the electrically conductive metals of Ni, and Ag and having a diameter of approximately 265 μm, is formed.

EXAMPLE 5

This example shows that a Cu coating is formed on the carbon coating by the electroless plating process, and, in addition, Cu and gold (Au) coatings are consecutively formed by the electroplating process.

Accordingly, the following steps are carried out, after step 10b of Example 3.

Step 11d: Cu coating formation (same as in step 11b of Example 3)

A Cu coating having a thickness of 10 μm is formed on the Cu coating.

Step 12d: The optical fiber is washed with water
Step 13d: Au coating formation (electroplating process)

An Au coating having a thickness of 2 μm is formed on the Cu coating by a cyanide silver sulfide electroplating process.

Figure 6:
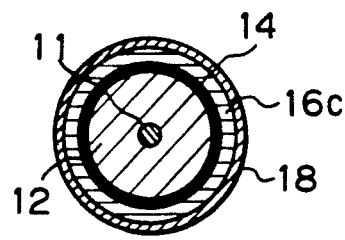

Step 14d: The optical fiber is washed with water
Step 15d: The optical fiber is washed with hot water
Step 16d: The optical fiber is dried FIG. 6 shows the optical fiber cable according to the above processes. The optical fiber cable comprises a double Cu coating 16c having a total thickness of 20 μm, and the Au coating 18 having a thickness of 2 μm. The core 11, the cladding 12, and the carbon coating 14 are identical to those in FIG. 2. Namely, an optical fiber cable coated by the electrically conductive metals of Cu and Au and having a diameter of approximately 169 μm, is formed.

The initial transmission losses of the optical fibers in Examples 1 to 5 and the Comparative Example shown below, as measured by a cut back method, are shown in Table 1.

COMPARATIVE EXAMPLE

An optical fiber is composed of a core, a cladding, and a carbon coating having a thickness of 500 Å.

TABLE 1

| Samples of optical fibers | Initial Transmission Loss dB/Km | |
|---|---|---|
| | At 1.3 μm | At 1.55 μm |
| Examples 1 to 5 | 0.36–0.38 | 0.22–0.24 |
| Comparative Example | 0.37 | 0.22 |

Note that the initial transmission loss of the optical fiber in the Comparative Example was equal to that of a standard optical fiber coated with a plastic layer.

Nevertheless the optical fiber cables of Examples 1 to 5 were subjected to the electroless plating process in which hydrogen and/or water could impregnate the cladding, but as seen from the results shown in Table 1, the carbon coating prevented the impregnation of hydrogen and/or water, and thus maintained the initial value of the transmission loss.

Table 2 shows the results measurements of the optical fibers under a bending test at 7 mm radius bend and a heat tolerance test for 24 hours at approximately 700° C. in air.

TABLE 2

| Samples optical fibers | Bending Test | Heat tolerance Test | |
|---|---|---|---|
| | | External appearance | Transmission loss |
| Ex. 1 | Passed | Surface oxide | No change |
| Ex. 2 | Passed | Surface oxide | No change |
| Ex. 2 | Passed | Surface oxide | No change |
| Ex. 4 | Passed | Good | No change |
| Ex. 5 | Passed | Good | No change |
| Comp. Ex. | Broken | carbon vaporized | No change |

Table 2 shows that the optical fiber cables having the conductive metal coating of Examples 1 to 5, according to the embodiment of the present invention, have a strong bending tolerance and a high heat tolerance.

The formation of such conductive metal coating can be also carried out by a sputtering method and an evaporation method.

Figure 7:
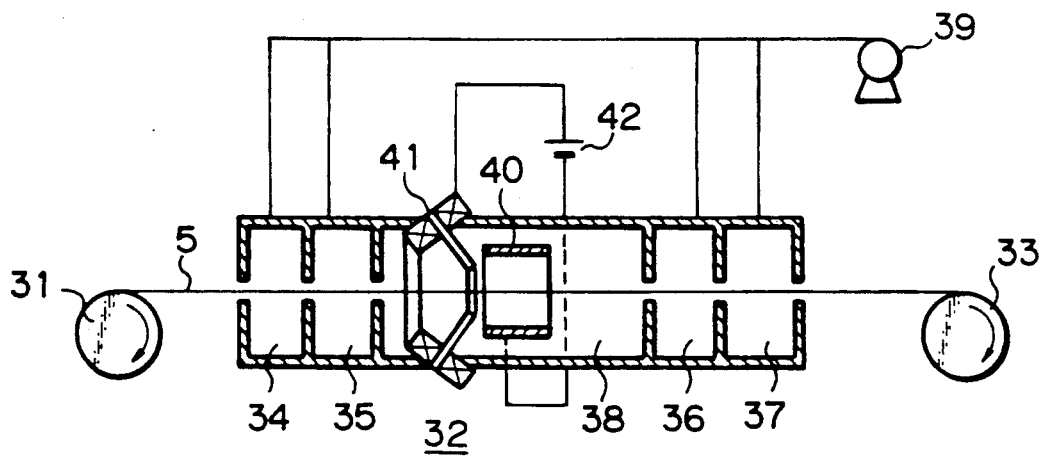
FIG. 7 is a schematic view of an apparatus for forming a cable coating on an optical fiber, as a second embodiment of an optical fiber cable making process according to the present invention.

A second embodiment of the present invention in which the sputtering method is used, will be described with reference to FIG. 7. FIG. 7 is a schematic view of a sputtering apparatus.

In FIG. 7, the optical fiber coated with the carbon coating or the optical fiber cable coated with the metal coating in accordance with the above embodiment (hereinafter, the optical fiber coated with the carbon coating will be described as an example) is supplied from a supply reel 31, introduced into a vacuum apparatus 32 and wound onto a take-up reel 33. The vacuum apparatus 32 is provided with a vacuum chamber 38, and first to fourth sealing rooms 34 to 37 provided at both sides of the vacuum chamber 38. A vacuum pump 39 extracts air in the vacuum chamber 38 to bring same to a vacuum condition. The sealing rooms 34 to 37 seal the vacuum chamber 38, to thereby maintain same at a high vacuum condition. A ring metal plate 40 functioning as an opposite electrode, and a ring ion gun 41 emitting ions onto the metal plate 40 are provided in the vacuum chamber 38, and a DC power source 42 is connected to the metal plate 40 and the ion gun 41.

During the passage of the optical fiber 5 coated with the carbon coating through the ring metal plate 40, metal particles sputtered from the ring metal plate 40, by ions emitted from the ion gun 41, are deposited on an outer surface of the carbon coating of the optical fiber 5.

More specifically, in this example, the ion gun 41 emits argon ion: $Ar^+$, the ring metal plate 40 is made of aluminium (Al), and the DC power source 42 supplies a voltage of 5 KV therebetween. As a result, an Al coating of an electrical conductive layer is formed on an outer surface of the carbon coating. The winding speed of the take-up reel 33 is determined in accordance with a thickness of the Al coating to be deposited by the sputtering method. In this example, the thickness of the Al coating is 5000 Å.

The kinetic energy of the Al particles sputtered from the Al plate 40 is high, and thus the Al particles are well deposited on the carbon coating. As is well known, Al is light, has a good bending characteristic and a high electrical conductivity, and accordingly, the Al coating is preferable as a metal coating.

The resultant properties and measured data obtained by the tests as set forth above are similar to those shown in Tables 1 and 2.

Instead of Al, other conductive materials can be formed on the carbon coating by suitably selecting the substance of the ion gun 41 and the metal plate 40, for example, conductive materials such as Au, Ag, or the like can be used.

If the sputtering was applied to an optical fiber not yet coated with the carbon coating, due to a high energy of $Ar^+$, an outer surface of the cladding could be damaged and a change of the properties of the optical fiber occur, for example, a degradation of the strength. In this embodiment, however, the outer surface is protected by at least the carbon coating, or preferably, further by the metal coating by the electroless plating process and/or the electroplating process, and since the sputtering is applied to such a coating, the cladding is not damaged by the high energy particles.

Figure 8:
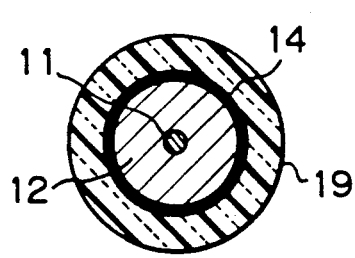
FIGS. 8 and 9 are sectional views of optical fiber cables formed by the second embodiment of the present invention.
Figure 9:
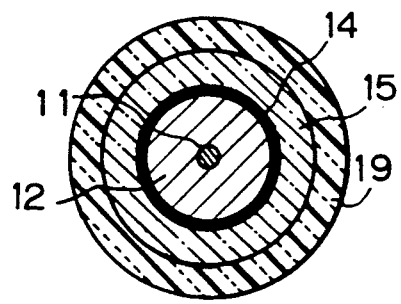

The formation of the metal coating by the sputtering method can be applied in a variety of modes. For example, as shown in FIG. 8, an Al coating 19 having a thickness of 5000 Å is directly formed on the carbon coating 14 by the sputtering method, instead of the Ni coating 15 formed by the electroless plating process as shown in FIG. 2, or as shown in FIG. 9, an Al coating 19 having a thickness of 5000 Å can be formed by the sputtering method on the Ni coating 15 formed by the electroless plating process and having a thickness of 10 μm, instead of the Cu coating 16 formed by the electroless plating process.

The DC sputtering has been described above, however, an RF (radio frequency) sputtering also can be applied in the same way.

Figure 10:
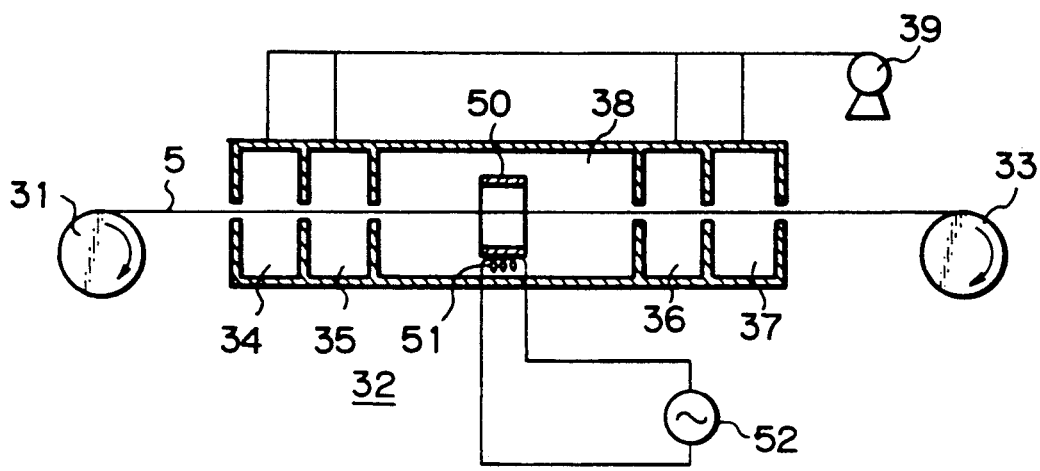
FIG. 10 is a schematic view of an apparatus for forming a cable coating on an optical fiber, as a third embodiment of an optical fiber cable making process according to the present invention.

A third embodiment of the present invention in which an evaporation method is applied will be described with reference to FIG. 10. FIG. 10 is a schematic view of a metal evaporation apparatus.

In FIG. 10, the supply reel 31, the vacuum apparatus 32, the take-up reel 33, the vacuum chamber 38, the first to fourth sealing rooms 34 to 37, and the vacuum pump 39 are similar to those of the sputtering apparatus in FIG. 7. The vacuum chamber 38 is provided with a ring metal plate 50 and a ring heater 51, and an AC power source 52 supplies an AC voltage to the ring heater 51 to heat same. During the passage of the optical fiber 5 coated with the carbon coating through the ring metal plate 50, metal particles evaporated from the metal plate 50 strongly heated by the heater 51 are deposited on an outer surface of the carbon coating.

The resultant properties and measured data obtained by the tests as set forth above are similar to those shown in Tables 1 and 2, except that the contact between the carbon coating and the metal coating is weaker.

The ring metal plate 50 can be made of Al, Ag, Au, Cu, Ni, or the like, and a thickness of the metal coating formed by the evaporation method is 5000 Å in this examples. Note, the evaporation method can be applied to the optical fiber further coated with the metal layer by the electroless plating and/or the electroplating processes in the same way as described above.

The above description is devoted to the single-mode optical fiber of a silica based glass as an example, but the present invention is not limited to such an optical fiber, and can be applied to other optical fibers such as a multi-mode optical fiber.

Many widely different embodiments of the present invention may be constructed without departing from the spirit and scope of the present invention, and it should be understood that the present invention is not restricted to the specific embodiments described above.

We claim:

1. An optical fiber cable comprising:
    an optical fiber of silica based glass, including a core and a cladding;
    a carbon coating formed on an outer surface of said optical fiber; and
    an electrically conductive coating formed on an outer surface of said carbon coating, wherein said electrically conductive coating is a conductive metal having high adhesion with said carbon coating.

2. An optical fiber cable according to claim 1, wherein said conductive coating comprises nickel.

3. An optical fiber cable according to claim 2, wherein an additional conductive coating having a small electrical resistance is formed on said nickel conductive coating.

4. An optical fiber cable according to claim 1, wherein said conductive coating comprises copper.

5. A process for making an optical fiber cable including an optical fiber made of silica based glass and having a core and a cladding, comprising the steps of:
    forming a carbon coating on an outer surface of said optical fiber; and
    forming an electrically conductive metal coating on said carbon coating by an electroless plating process, said electrically conducting metal coating having high adhesion with said carbon coating.

6. A process for making an optical fiber cable according to claim 5, wherein said forming of said electrically conductive metal coating comprises the steps of:
    forming a first metal coating on said carbon coating by a electroless plating process, and
    forming a second metal coating having a small electrical resistance on said first metal coating by an electroplating process.

7. A process for making an optical fiber cable including an optical fiber made of silica based glass and having a core and a cladding, comprising the steps of:
    forming a carbon coating on an outer surface of said optical fiber;
    forming a first metal layer on said carbon coating by an electroless plating process, said first metal layer having a good contact with said carbon coating;
    forming a second metal layer on said first metal layer by an electroless plating process; and
    forming a conductive metal coating having a small electrical resistance on said second metal layer by an electroplating process, said second metal layer having a good contact with said conductive metal coating formed by the electroplating process.

8. A process for making an optical fiber cable including an optical fiber made of silica based glass and having a core and a cladding, comprising the steps of:
- forming a carbon coating on an outer surface of said optical fiber;
- forming a first metal layer having good contact with said carbon coating on said carbon coating by an electroless plating process;
- forming a second metal layer having a good contact with said first metal layer, said second metal layer being formed by an electroplating process on said first metal layer; and
- forming a conductive metal coating having a small electrical resistance on said second metal layer by an electroplating process.

9. A process for making an optical fiber cable according to claim 5, wherein said forming of said electrically conductive metal coating comprises the steps of:
- forming a first metal layer having high adhesion with said carbon coating on said carbon coating by the electroless plating process, and
- forming a second metal layer on said first metal layer by a metal evaporation method.

10. A process for making an optical fiber cable according to claim 5, wherein said forming of said electrically conductive metal coating is carried out by a sputtering method.

11. A process for making an optical fiber cable according to claim 5, wherein said forming of said electrically conductive metal coating is carried out by a metal evaporation method.

12. A process for making an optical fiber cable according to claim 5, wherein said forming of said carbon coating is carried out so as to form an amorphous carbon coating.

13. A process of making an optical fiber cable including an optical fiber made of silica based glass and having a core and a cladding, comprising the steps of:
- forming a carbon coating on an outer surface of said optical fiber;
- forming a metal coating having good contact with said carbon coating on said carbon coating by an electroless plating process; and
- forming a conductive metal layer on said metal layer by a sputtering method.

14. A process for making an optical fiber cable including an optical fiber, comprising the steps of:
- forming a carbon coating on an outer surface of said optical fiber;
- forming a first metal coating on said carbon coating by an electroless plating process; and
- electroplating a second metal coating on said first metal coating, said second metal coating having low electrical resistance.

15. A process for making an optical fiber cable including an optical fiber, comprising the steps of:
- forming a carbon coating on an outer surface of the optical fiber;
- forming a first metal layer on said carbon coating by an electroless plating process, said first metal layer having high adhesion with said carbon coating;
- forming a second metal layer on said first metal layer by an electroless plating process; and
- electroplating a third metal layer on said second metal layer, said third metal layer having low electrical resistance and having high adhesion for said second metal layer.

16. A process for making an optical fiber cable including an optical fiber, comprising the steps of:
- forming a carbon coating on an outer surface of the optical fiber;
- forming a first metal layer on said carbon coating by an electroless plating process, said first metal layer having high adhesion with said carbon coating;
- electroplating a second metal layer on said first metal layer, said second metal layer having high adhesion with said first metal layer; and
- electroplating a third metal layer on said second metal layer, said third metal layer having low electrical resistance.

17. A process for making an optical fiber cable including an optical fiber, comprising the steps of:
- forming a carbon coating on an outer surface of the optical fiber;
- forming a first metal layer on said carbon coating by an electroless plating process, said first metal layer having high adhesion to said carbon coating; and
- sputtering a second metal layer on said first metal layer.

* * * * *